Dec. 27, 1966  M. BAERMANN  3,294,946
EDDY CURRENT HEATING DEVICE
Original Filed Jan. 25, 1962  4 Sheets-Sheet 1

INVENTOR.
MAX BAERMANN
BY Alfred C. Boely
ATTORNEY

Dec. 27, 1966  M. BAERMANN  3,294,946
EDDY CURRENT HEATING DEVICE
Original Filed Jan. 25, 1962  4 Sheets-Sheet 2

INVENTOR.
MAX BAERMANN
BY

ATTORNEY

Dec. 27, 1966     M. BAERMANN     3,294,946
EDDY CURRENT HEATING DEVICE

Original Filed Jan. 25, 1962     4 Sheets-Sheet 3

*INVENTOR.*
MAX BAERMANN
BY

ATTORNEY

Dec. 27, 1966  M. BAERMANN  3,294,946
EDDY CURRENT HEATING DEVICE
Original Filed Jan. 25, 1962  4 Sheets-Sheet 4

INVENTOR.
MAX BAERMANN
BY

ATTORNEY

United States Patent Office
3,294,946
Patented Dec. 27, 1966

3,294,946
EDDY CURRENT HEATING DEVICE
Max Baermann, Bensberg Wulfshof,
Cologne (Rhine), Germany
Continuation of abandoned application Ser. No. 168,616,
Jan. 25, 1962. This application July 16, 1964, Ser. No.
384,820
Claims priority, application Germany, Aug. 12, 1961,
B 63,637
9 Claims. (Cl. 219—10.49)

This application is a continuing application of my copending application Serial No. 168,616 filed January 25, 1962, now abandoned.

The present invention pertains to the art of eddy current heating devices and more particularly to an eddy current heating device for heating solid or liquid foods packaged in metal containers, such as metal foil containers used in packaging frozen foods.

The present invention is particularly applicable to heating frozen solids and liquid foods packaged in thin metal containers and it will be described with particular reference thereto; however, it is to be appreciated that the invention has broader applications and may be used for eddy current heating of a variety of articles.

It is commonly known that solid and liquid foods especially pre-cooked foods, are frozen in sheet aluminum containers by a variety of low temperature cooling processes, and in this manner the foods can be preserved for prolonged periods. To thaw these foods, it has heretofore been conventional to place them with the container either opened or unopened, in an oven. One of the problems has been the unduly long time to thaw the food and bring it to the serving temperature. This is due to the inefficiency of heat transfer from the heated air to the container and to the tendency for the shiny aluminum to reflect the heat rather than absorbing it. In the past, it has taken about 20–30 minutes to thaw a frozen food package. This comparatively long thawing time has been a substantial obstacle in the complete acceptance of frozen pre-cooked foods. Also the long thawing time raises problems of producing undesired flavors or odors in the food. Another disadvantage is that the known warming or thawing devices for frozen foods can accommodate only foods requiring the same thawing time and cannot simultaneously thaw frozen foods which require various heating periods.

These disadvantages and others are eliminated by the present invention which relates to an eddy current heating device adapted to thaw and otherwise heat solid and liquid foods in a thin metal container which device is economical to produce and efficient in operation.

Unless otherwise indicated, the term "eddy current heating" as used herein refers both to heat generated by the flow of eddy currents and the heat generated by the flow of hysteresis currents which are produced when using the present invention to heat food packaged in ferromagnetic materials, such as tin-plate.

In accordance with the present invention, there is provided an eddy current heating device adapted to heat a substance in a thin metal container, the device comprising in combination: an electrically non-conductive means for supporting said container and magnetic means for passing in rapid succession a plurality of magnetic fields substantially perpendicular through said container with successive fields having opposite direction and substantially equal magnitude.

In accordance with another aspect of the present invention, there is provided an eddy current heating device for heating a substance in a thin metal container, the device comprising in combination: at least a pair of spaced multipolar magnetic disks rotatable about an axis and each disk having a plurality of circumferentially spaced, alternate north and south magnetic poles, each north magnetic pole of one disk facing a south magnetic pole of the other disk to create magnetic fields substantially parallel to the axis of rotation of the disks, adjacent magnetic fields being of opposite polarity and means for supporting the metal container between the disks as they rotate.

In accordance with still another aspect of the present invention, an eddy current heating device as defined above is provided with an electrically non-conductive means for securing the metal container between the disks and for releasing the container after a preset time has lapsed or a given temperature of the container has been reached whereby the motor action between the magnetic field of the container and the magnetic fields between the disks shifts the container from between the disks.

In operation of the present invention, the eddy current generated by the multipolar revolving disks heats the thin metal container. At least two revolving multipolar disks are provided between which the thin metal container is secured and exposed to the revolving magnetic fields so that the lines of force of each field extend from the north magnetic pole on one disk to a south magnetic pole on another disk and penetrate the metal container substantially perpendicularly to the direction of movement of the container.

The use of eddy current effect for heating of liquids or foods in metal containers is known and the present invention is an improvement over such prior devices. In the prior devices a comparatively thick walled, open container was used so that the eddy current was generated in a reinforced bottom of the container by a single rotating magnetic disk. Such a device in no way suggested that an equally advantageous effect would result by establishing eddy current in the very thin foils such as aluminum foil provided around frozen foods. In these prior eddy current heating devices, only one magnetic pole disk was provided and the lines of force always returned to a magnetic pole on the same disk without completely penetrating the object to be heated. The present invention contemplates directing the lines of force between two rotating magnetic pole disks placed on each side of the metal container, or package, in such a way that the package is penetrated perpendicularly by the lines of force extending between the rotating magnetic pole disks.

The primary object of the present invention is to provide an eddy current heating device which is efficient in operation and easily constructed.

A further object of the present invention is the provision of an eddy current heating device which is adapted to heat substances, especially frozen foods, wrapped in a thin metal foil without requiring an additional heating element.

Still another object of the present invention is the provision of an eddy current heating device which efficiently heats frozen food and other such materials wrapped in a thin metal foil in a minimum time.

Yet another object of the present invention is the provision of an eddy current heating device for heating a substance in a metal container which device automatically removes the container from the heating portion of the device by the ponderomotive forces resulting from the magnetic field caused by the current flowing in the container during heating.

Another object of the present invention is the provision of an eddy current heating device which heats a substance in a thin metal container by successively passing magnetic fields of opposite directions, perpendicularly through the container.

A further object of the present invention is the provision of an eddy current heating device for heating a substance in a thin metal container which generates heat in the walls of the container and which thereby allows efficient heating of the substance while the container is closed.

Still a further object of the present invention is the provision of an eddy current heating device adapted to heat a substance in a thin metal container comprising at least two spaced multipolar magnetic disks each having circumferentially spaced, alternate north and south magnetic poles, each north magnetic pole of one disk substantially opposite a south magnetic pole of the opposite disk and the container positioned between the disks as the disks rotate so that the magnetic fields between the disks pass substantially perpendicular through the container.

Another object of the present invention is the provision of an eddy current heating device adapted to heat a substance in a thin metal container comprising at least two spaced multipolar magnetic disks each having circumferentially spaced alternate north and south magnetic poles, each north magnetic pole of one disk substantially opposite a south magnetic pole of the opposite disk, an electrically non-conductive means for securing the container between the disks as the disks rotate whereby the container is heated and means for releasing the container after a time lapse or after the container has reached a given temperature so that ponderomotive forces repel the container from between the rotating disks.

These and other objects and advantages will become apparent from the following description used to illustrate the preferred embodiments of the invention as read in connection with the accompanying drawings in which.

Figure 1:
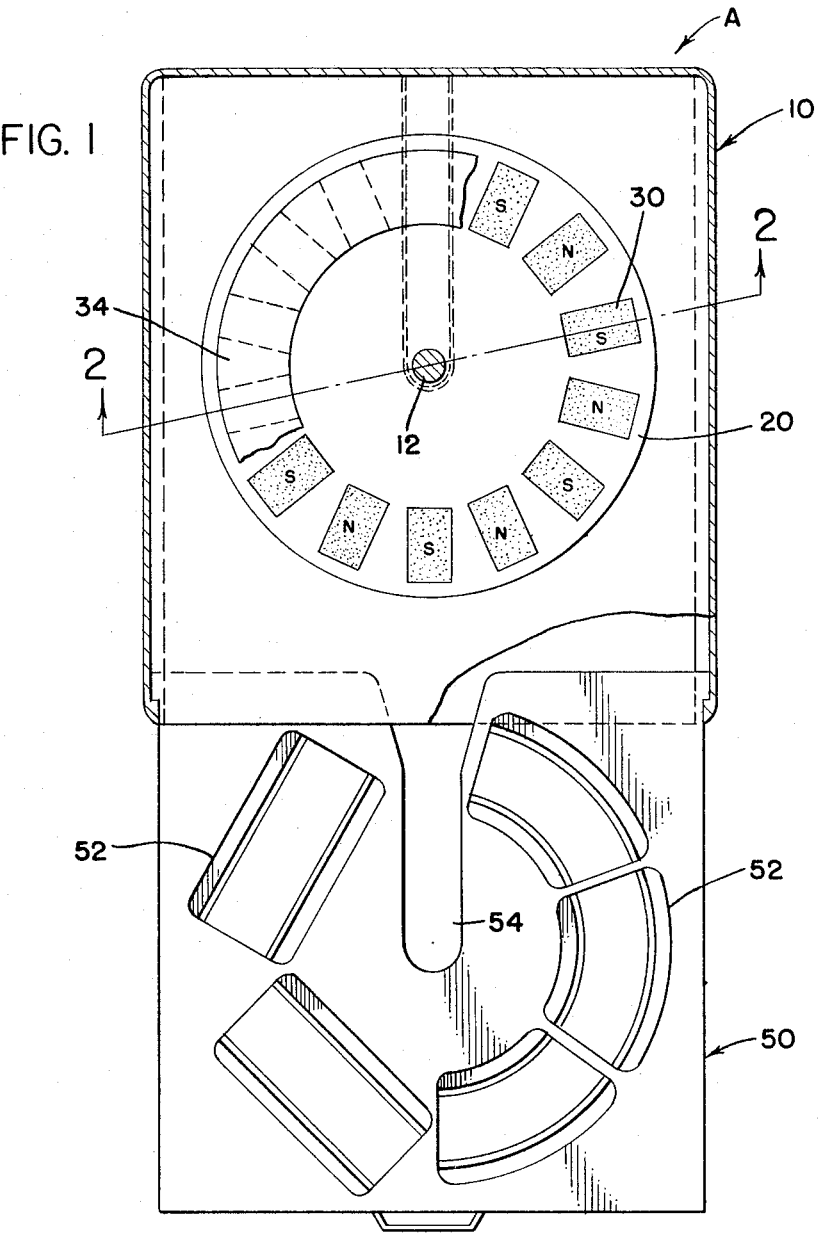
FIG. 1 is a partially cross-sectioned top view of the preferred embodiment of the present invention.
Figure 2:
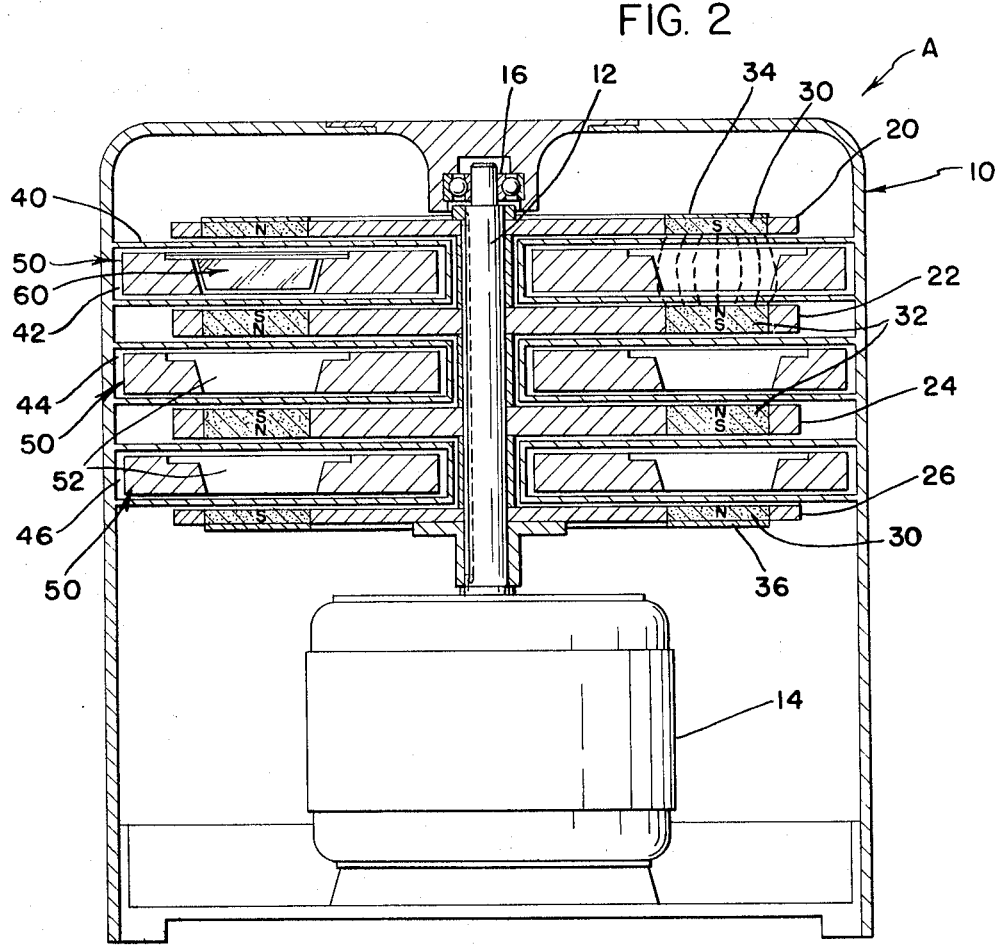
FIG. 2 is an enlarged cross-sectional view along line 2—2 of FIG. 1.

Referring now to the drawings, wherein the showings are for the purpose of illustrating preferred embodiments of the invention only and not for the purpose of limiting same, FIGS. 1 and 2 show an eddy current heating device A constructed in accordance with the present invention wherein there is provided an outer housing 10 which may be constructed from a variety of materials such as metal, wood or plastic. Within the housing there is provided a vertically extending shaft 12 driven by an appropriate means, such as motor 14, and journaled by an appropriate bearing 16. Spaced along the length of shaft 12 are a plurality of multipolar magnetic pole disks, 20, 22, 24, 26 each of which is provided with a plurality of spaced permanent magnets 30 and 32 presenting circumferentially spaced, alternately positioned north and south magnetic poles. In the preferred embodiment, the magnets 30 on disks 20 and 26 are connected by ferromagnetic rings 34, 36 respectively which complete the magnetic circuit of the magnets 30 at either end of the shaft 12. Magnets 32 have a thickness approximately twice the thickness of magnets 30 and are so mounted on disks 22 and 24 to create magnetic fields on either side thereof. The exposed polarity of the magnets is indicated in FIG. 2 wherein, according to the preferred embodiment, the facing magnetic pole disks are characterized by having the north magnetic pole of each disk opposite a south magnetic pole of the disk spaced therefrom. By this arrangement the magnetic fields between the spaced disks are substantially perpendicular to the facing surfaces of the spaced disks or, stated another way, the magnetic fields between the disks are parallel to the axis of rotation of the disks. The adjacent magnetic fields are of opposite polarity and have substantially the same magnitude.

Although the position of the magnets 30 and 32 may be shifted slightly, they should be positioned so that the magnetic fields pass substantially perpendicular to the facing surfaces of adjacent disks. According to the invention an especially effective arrangement for the magnets is obtained if the spacing between the edges of adjacent magnets on each disk is equal to, or greater than, the vertical distance between the magnetic poles of adjacent disks. By so arranging the magnets, the greatest part of the flux lines created by the magnets extend between the disks and a lesser amount of the flux lines extend between adjacent poles on each disk.

In the preferred embodiment disclosed in FIGS. 1 and 2 it is noted that a plurality of multipolar magnetic pole disks are provided; however, it is appreciated that the invention would function if only two spaced disks were provided. By including a plurality of spaced pole disks, it is possible to increase the capacity of the heating device.

The magnets in the pole disks 22 and 24 are preferably imbedded in a non-magnetic material, such as a heat treated light metal alloy, to thereby reduce the weight of the revolving parts. If such material is also electrically conductive, a short-circuit loop is provided around the individual magnets to prevent or lessen demagnetizing effects on the magnets. It is also advantageous to use an anisotropic permanent magnet material with high coercive force and low permeability, such as barium-ferrite, strontium-ferrite or bismuth-manganese which lessens the dispersion of the magnetic fields between adjacent magnets on each disk and thereby causes a greater portion of the magnetic lines of force to pass between the disks. These materials are also characterized by having a lower permeability perpendicular to the direction of magnetization than in the direction of magnetization. The high coercivity force is desirable in order to reduce appreciably the drop in the lines of force due to the strong armature reaction occurring while the disks rotate.

Figure 3:
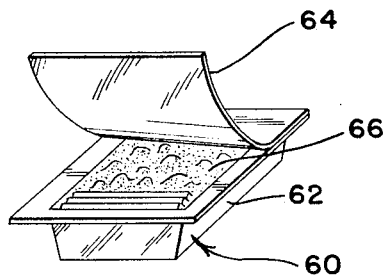
FIG. 3 is a perspective view of a light metal frozen food container.

The space between the rotating pole disks is enclosed, in the preferred embodiment, by a series of electrically nonconductive partitions 40 which define heating chambers 42, 44 and 46 extending generally perpendicular to shaft 12 which rotates the pole disks. A plurality of electrically nonconductive drawers 50 are adapted to be slidably received within the heating chambers and are provided with a plurality of appropriately positioned recesses 52 and a relieved portion 54 which allows the drawer 50 to slide around the shaft 12. (See FIG. 1.) The recesses are so dimensioned to receive a thin metal container such as a frozen food container 60 illustrated in FIG. 3 comprised of a dish-shaped portion 62 of thin electrically conductive material, such as aluminum or other metal foil, and a thin metal lid 64 for protection of the food or other material 66 within the container.

In operation, the metal container 60, or a similar container, is positioned within one of the recesses 52 and the drawer 50 is moved transversely into one of the heating chambers. Thereafter the motor 14 rotates the pole disks and the magnetic fields between adjacent permanent magnets passes substantially perpendicularly through the container 60 as the disks rotate. The magnetic field passing through the container changes direction as subsequent pairs of north and south magnetic poles come into proximity with the container, and currents are thereby geenrated within the walls of the electrically conductive container to heat the material 66. Current flow can also be generated within the container by moving the metal container through the magnetic fields. The heated walls of the container are in direct contact with the material 66 and heat is conducted directly to the material.

Heat is produced in the thin electrically conductive walls of the container so that heat energy is conducted directly to the food within the container without a substantial heat gradient material; and it has been found that if the container is heated by the eddy current device A while the lid 64 is closed, heat energy is conducted into the material in the container from all directions. In contrast, an apparatus which heats food in an aluminum container by heating the air around the container, has low thermal efficiency because of substantial heat losses in the surrounding air and in the wall themselves and also because of a substantial portion of the heat energy in the surrounding air is reflected from the container. These heat losses are substantially eliminated by generating the heating energy in the container walls and the efficiency of the device is correspondingly increased.

Figure 4:
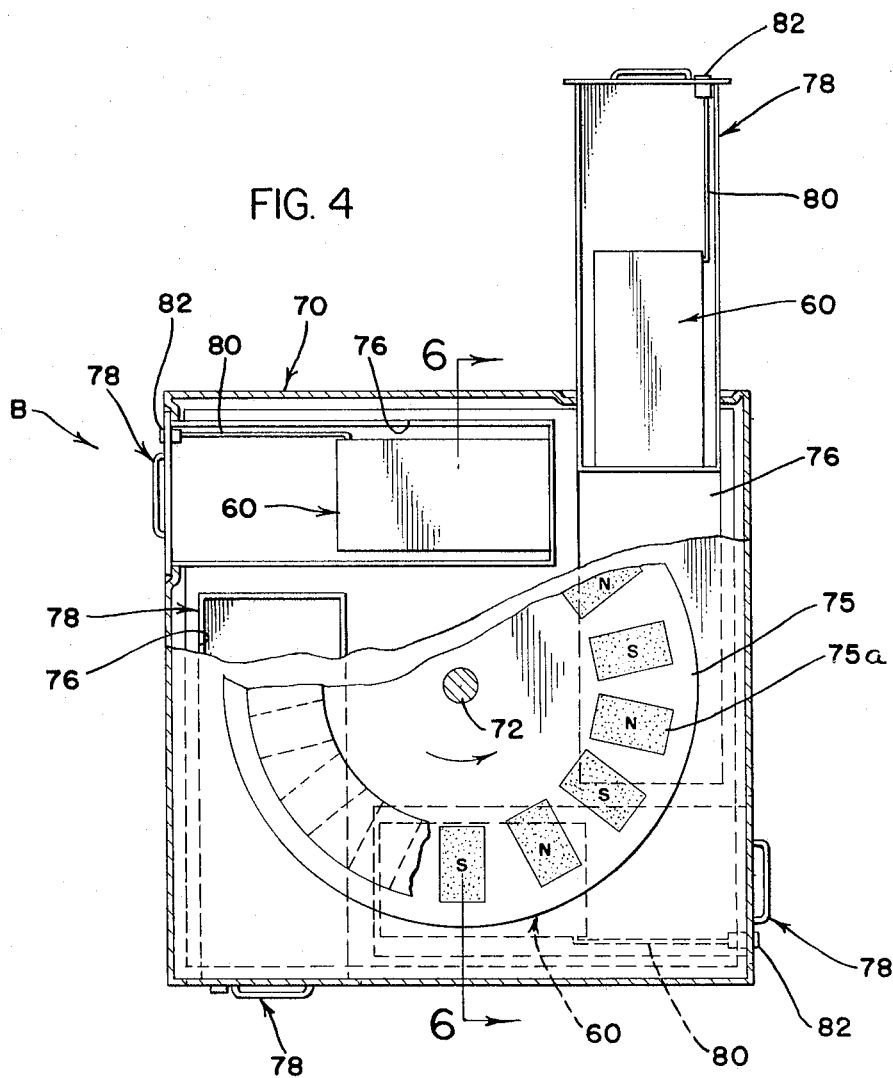
FIG. 4 is a partially cross-sectioned top view of a second embodiment of the present invention.
Figure 5:
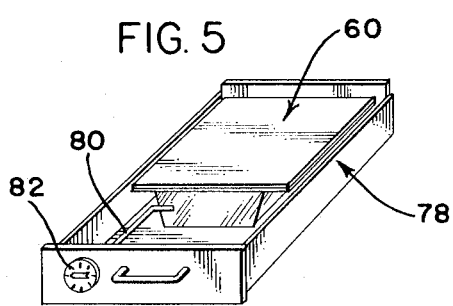
FIG. 5 is a perspective view of a drawer to be used in the embodiment disclosed in FIG. 4.
Figure 6:
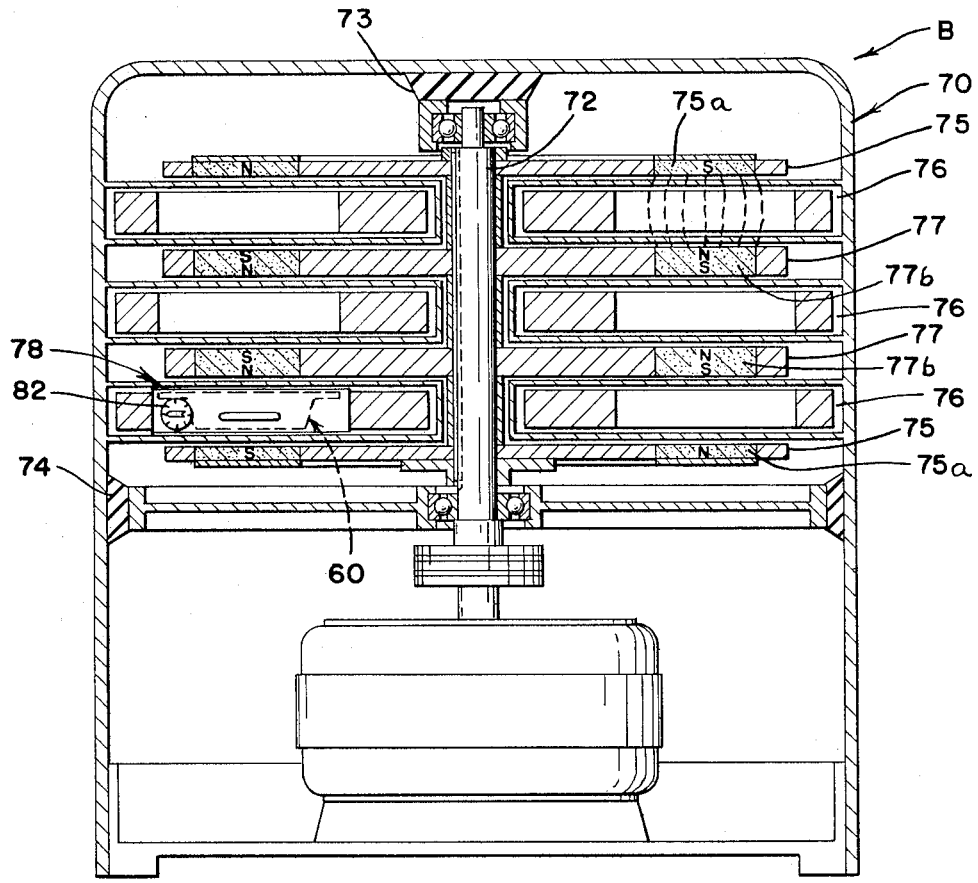
FIG. 6 is a cross-sectional view along line 6—6 of FIG. 4.

Referring now to FIGS. 4-6, the heating device B is provided with a housing 70 having an upwardly extending shaft 72 resiliently mounted by appropriate shock absorbing connections 73, 74 and carrying spaced pole disks 75, 77 substantially identical to the pole disks illustrated in FIGS. 1 and 2 and having circumferentially spaced magnets 75a, 77b respectively. The device B is provided with a plurality of heating chambers 76 which are constructed of electrically non-conductive material and are positioned substantially tangential to the centerline of the path generated by the spaced magnets 75a, 77b as they rotate. The disks are rotated as indicated by the arrow in FIG. 4 so that the separate drawers 78 are slidably received within the heating chambers 76 in a direction opposite the direction of rotation of the disks. In accordance with one aspect of the present invention, the drawers 78 are each provided with a stop or other mechanism 80 which is controlled by a device 82. This device 82 may be set to release the stop 80 from the package 60 after the time required to heat the container 60 has lapsed or after the temperature to which the container 60 should be heated is reached. It is appreciated that the stop 80 and the device 82 are only schematically represented as a rotatable lever and control means therefor, which level holds the container 60 against the rear of the drawer 78 until the control means rotates the lever out of engagement with the container after an appropriate condition is obtained. A variety of other arrangements could be provided without departing from the spirit and scope of this invention. Appropriate means are provided for latching the drawer within the heat chamber 76. Also it is possible to eliminate the drawer 78 and releasably position the container 60 directly within the chamber 76.

In operation of the embodiment disclosed in FIGS. 4-6, the container 60 is positioned within drawer 78 and held rearwardly therein by an appropriate means such as stop 80. The device 82 is set for the desired temperature or time, the drawer is positioned within the heating chamber 76 and the pole disks are rotated. The container 60 is heated by the principle discussed in connection with the embodiment disclosed in FIGS. 1 and 2; and after the container is properly heated, the stop 80 rotates out of engagement with the package and ponderomotive forces created by the currents generated in the container repel the container tangentially outwardly. It is possible to provide a catch on the drawer 78 so that the drawer is forced outward a slight distance when the repelled package 60 hits the front portion of the drawer to indicate that the container may be removed. By this construction, packages or containers having different heating requirements may be heated in one cabinet at the same time. Also it is within the contemplation of the invention to provide the heating information on the package so that setting of device 82 may be read directly from each package.

By constructing the heating device in accordance with the present invention, it is possible to heat frozen foods from −20° C. to 80° C. in 3-8 minutes. It is also possible to adapt the heating cycle to the particular kind of foods and the temperature requirements thereof so that the food is heated, then automatically released from the heating device. It has been found that the degree of efficiency of the present device is very high because nearly all of the mechanical energy input to the rotating shaft is changed into heat at the container.

In addition to the short heating time, when using the present invention, the foods are released from the metal containers with extraordinary ease. This obviously occurs because the fast circulating magnetic alternating fields vibrate the metal surfaces of the containers to prevent adhesion of the foods.

The present invention has been described in conjunction with two preferred embodiments; however, it is appreciated that the invention is not to be limited by the structural details illustrated herein and various changes may be made without departing from the spirit and scope of the present invention as defined in the appended claims.

Having thus described my invention, I claim:

1. An eddy current heating device for heating a substance in a thin metal container, the device comprising in combination: at least a pair of spaced, multipolar magnetic disks rotatable about an axis and each disk having a plurality of circumferentially spaced, alternate north and south magnetic poles, each north magnetic pole of one disk facing a south pole of the other disk to create a plurality of magnetic fields each having an axis substantially parallel to the axis of rotation of the disks, adjacent magnetic fields being of opposite direction, electrically non-conductive means for supporting the thin metal container between the disks and means for rotating said disks while said container is stationary.

2. An eddy current heating device for heating a substance in a thin metal container, the device comprising in combination: at least a pair of spaced, multipolar magnetic disks rotatable about an axis and each disk having a plurality of circumferentially spaced, alternate north and south magnetic poles, each north magnetic pole of one disk facing a south magnetic pole of the other disk to create a plurality of magnetic fields each having an axis substantially parallel to the axis of rotation of said disks, adjacent magnetic fields being of opposite direction, electrically non-conductive means for supporting said metal container between said disks, power means for rotating said disks while said container is stationary and release means for selectively releasing said container from said support means.

3. An eddy current heating device as defined in claim 2 wherein said release means includes a temperature responsive element for releasing said container.

4. An eddy current heating device as defined in claim 2 wherein said release means includes a time responsive element for releasing said container.

5. An eddy current heating device for heating a substance in a thin metal container, the device comprising in combination: at least a pair of spaced, multipolar magnetic disks rotatable about an axis and each disk having a plurality of circumferentially spaced, alternate north and south magnetic poles, each north magnetic pole of one disk facing a south magnetic pole of the other disk to create a plurality of magnetic fields each having an axis substantially parallel to the axis of rotation of the disks, adjacent magnetic fields being of opposite direction, means for rotating said disks about said axis so said magnetic poles revolve in a substantially circular path, an electrically non-conductive support means between said disks and extending generally tangential to said path for slidably receiving said metal container in a direction opposite the direction of rotation of said disks, latch means for holding said container on said support means and between said disks and release means for selectively unlatching said latch means.

6. An eddy current heating device for heating a substance packaged in a thin metal container, the device comprising in combination: at least a pair of spaced, multipolar magnetic disks rotatable about an axis and each disk having a plurality of circumferentially spaced, alternate north and south magnetic poles, each north magnetic pole of one disk facing a south magnetic pole of the other disk to create a plurality of magnetic fields each having an axis substantially perpendicular to the axis of rotation of the disks, adjacent magnetic fields being of opposite direction, means for rotating said disks about said axis so said magnetic poles revolve in a substantially circular path, guide means extending between said magnetic poles and extending substantially tangential to said circular path for supporting said metal container and for allowing said container insertion between said disks in a direction opposite to the direction of rotation of said disks, latch means on said guide means for locking said container between said disks, release means for selectively unlatching said latch means, and a stop means for limiting the outward movement of said container with respect to said circular path.

7. In an eddy current heating device adapted to heat a substance in a thin metal container, the device comprising in combination: an electrically non-conductive means for supporting said container and mechanical means for passing in rapid succession a plurality of magnetic fields substantially perpendicularly through said container with successive fields having opposite direction and substantially equal magnitude, said magnetic means comprising a pair of spaced magnetic disks adapted to rotate about an axis and each disk having a plurality of circumferentially spaced, alternate north and south magnetic poles, each north magnetic pole of one disk facing a south magnetic pole of the other disk, and power means for rotating said disks in unison with said electrically non-conductive means located between said disks.

8. An eddy current heating device as defined in claim 7 wherein said metal container comprises an aluminum foil dish-shaped bottom portion.

9. An eddy current heating device as defined in claim 7 wherein edges of adjacent north and south magnetic poles on each disk are spaced one from the other a distance equal to or greater than the spacing between said disks.

References Cited by the Examiner

UNITED STATES PATENTS

| | | | |
|---|---|---|---|
| 2,566,274 | 8/1951 | White et al. | 219—10.49 |
| 2,600,566 | 6/1952 | Moffett | 219—10.55 |
| 2,714,070 | 7/1955 | Welch | 219—10.55 |
| 2,912,552 | 11/1959 | Baermann | 219—10.49 |
| 3,014,116 | 12/1961 | MacArthur | 219—10.49 |
| 3,085,142 | 4/1963 | Baermann | 219—10.49 |

FOREIGN PATENTS 1,237,560   6/1960   France.

RICHARD M. WOOD, *Primary Examiner.*

L. H. BENDER, *Assistant Examiner.*